(12) United States Patent
Conrad et al.

(10) Patent No.: US 8,360,093 B2
(45) Date of Patent: Jan. 29, 2013

(54) PILOT FILL VALVE

(75) Inventors: Paul Conrad, Ashland, OH (US);
Wilson Enrique Sandoval Medina, Bogota (CO)

(73) Assignee: Mansfield Plumbing Products, LLC, Perrysville, OH (US)

( * ) Notice: Subject to any disclaimer, the term of this patent is extended or adjusted under 35 U.S.C. 154(b) by 412 days.

(21) Appl. No.: 12/710,698

(22) Filed: Feb. 23, 2010

(65) Prior Publication Data

US 2011/0203681 A1    Aug. 25, 2011

(51) Int. Cl.
*F16K 21/18* (2006.01)

(52) U.S. Cl. ........ 137/425; 137/426; 137/427; 137/431; 137/435; 137/436

(58) Field of Classification Search ........... 137/414, 137/424–427, 431, 435, 436
See application file for complete search history.

(56) References Cited

U.S. PATENT DOCUMENTS

| | | | |
|---|---|---|---|
| 3,693,649 A | 9/1972 | Gordon et al. | |
| 5,255,703 A | 10/1993 | Johnson | |
| 5,421,361 A | 6/1995 | Johnson | |
| 5,439,025 A | 8/1995 | Johnson | |
| 5,836,346 A | 11/1998 | Nichols-Roy | |
| 5,975,125 A * | 11/1999 | Nichols-Roy | 137/436 |
| 6,354,326 B1 | 3/2002 | Le et al. | |
| 6,666,228 B1 | 12/2003 | Li | |
| 6,679,287 B2 | 1/2004 | Huang | |
| 6,913,035 B2 | 7/2005 | Huang | |
| 7,028,704 B2 | 4/2006 | Taylor et al. | |
| 7,559,337 B2 | 7/2009 | Han | |
| 8,166,997 B2 * | 5/2012 | Fukuzawa et al. | 137/444 |

* cited by examiner

*Primary Examiner* — Craig Schneider
(74) *Attorney, Agent, or Firm* — Renner Kenner Greive Bobak Taylor Weber

(57) ABSTRACT

A pilot fill valve includes a float that is separated into upper and lower cavities by an angled partition through which a drain outlet and an overflow outlet are disposed. When the level of the float drops, a portion of the water supplied to the fill valve is diverted to a tank to raise the float, while the remainder is diverted to the upper cavity increasing the weight of the float. As the float begins to rise, the water in the upper cavity drains through the drain outlet and overflow outlet, making the float lighter, and causing the float and pivot arm to rotate with increased velocity, allowing the pilot cap carried by the pivot arm to fully shut off the valve.

18 Claims, 5 Drawing Sheets

PILOT FILL VALVE

TECHNICAL FIELD

Generally, the present invention relates to pilot fill valves to control the filling of a tank, such as a toilet flush tank. More particularly, the present invention relates to a pilot fill valve that has a partitioned float with an integral overflow to precisely control the on and off states of the valve.

BACKGROUND ART

Conventional toilets typically employ a tank mounted above a waste-containing bowl from which a quantity of water is rapidly drained to flush the waste therefrom and into a sewage system. One common toilet design utilizes a flapper valve made of an elastomeric material that normally covers the drain outlet of the tank. When the flush handle on the outside of the tank is depressed by the user, the flapper valve is lifted and the water in the tank moves through the toilet drain outlet and into the sewer system. The flapper valve is designed with an inverted air chamber so that it floats as it is lifted away from the drain outlet in the bottom of the tank. This allows a sufficient amount of flush water to flow into the bowl even if the user immediately releases the flush handle. Additionally, when the water level in the tank drops, it is automatically refilled through a fill valve connected to a high-pressure water supply line.

One of the most common types of fill valves is a ballcock fill valve, which provides a vertical water inlet tube or pipe that is connected to a water supply system. The ballcock fill valve also includes a water valve and a float that is coupled thereto by a long horizontal rod. Typically, such conventional floats are ball-shaped and float on the surface of the water within the tank to monitor its level. When the tank is filled, the water valve is closed to block the inflow of water through the inlet tube. Once a flushing operation has been completed, the water level in the tank drops to nearly the bottom, causing a corresponding drop in the float as well. As a result of the movement of the float, the water valve is opened allowing water from the water supply system to enter the tank. After the water within the tank has reached a predetermined level, the float moves upward, causing the water valve to close, stopping the flow of water into the tank.

Unfortunately, ballcock fill valves require substantial space to accommodate the operation of the lever mechanism that couples the ball float to the water valve. In addition, due to the nature of ballcock valves, they often deliver an imprecise water level when the valve is subjected to different water inlet pressures.

To overcome the drawbacks of ballcock fill valves, pilot valves have been developed. Pilot fill valves include a substantially vertical water inlet pipe that is configured for connection to a water supply at one end and for connection to a main valve structure at another end. In addition, a float structure, which is mechanically coupled to the main valve body by means of a substantially vertical rod, responds to and continually follows the vertical movement of the float. A lever is employed to couple the vertical rod to a pilot valve element provided by the main valve body. As such, the pilot valve element actuates a flexible diaphragm disposed upon a water inlet seat to control the flow of water received from the water supply inlet pipe through the main valve body, thereby controlling the on and off states of the valve.

When the water in the tank falls below its normally filled level immediately following a flushing operation, the lever-controlled pilot element is raised, allowing the diaphragm to in turn rise above the water inlet seat of the valve body. This allows water to flow freely through the main valve and into the tank. When the water level has risen sufficiently within the tank, the lever-controlled pilot element is returned to its lowered position, thereby causing the diaphragm to be repositioned on the water inlet seat, thereby shutting off the flow of water into the tank.

Current pilot fill valves are costly and use various methods to shut themselves off at the correct speed once the tank water level is near full. If the valve takes too long to shut off, a typical user may think that the toilet is leaking when in fact the tank is filling slowly as the valve is near the off position. While various methods have been utilized to prevent slow tank filling near the off position, current pilot fill valves tend to make the valve shut off very quickly, causing the inlet water pipes to rattle and make unpleasant noise.

Therefore, there is a need in the art for a pilot fill valve that utilizes a float having an upper cavity to allow water from an outlet port to be routed and collected to increase the weight of the float. In addition, there is a need for a pilot fill valve having a float with an upper cavity, whereby an overflow allows water collected therein to escape, allowing the weight of the float to be reduced quickly so that the buoyancy forces imparted by the rising tank water remain sufficient to lift the float to ensure the valve is fully turned off.

SUMMARY OF INVENTION

In general, the present invention provides a float adapted to be attached to a pivot arm of a pilot fill valve, the pilot fill valve having an outlet port extending therefrom that supplies water to a diverter attached to the pivot arm, the float comprising a float divided by an angled partition sloping upward from a first edge to a second edge to form first and second cavities, an overflow outlet disposed through said partition proximate to said rear edge, and a drain outlet disposed through said partition between said front edge and said overflow outlet.

Another aspect of the present invention provides a pilot fill valve comprising a pilot fill valve having a rotating pivot arm with a diverter configured to divert water received from a outlet port; and a float attached to said pivot arm, said float divided by an angled partition sloping upward from a first edge to a second edge, to form first and second cavities, said first cavity configured to receive diverted water from said outlet port, said float comprising an overflow outlet disposed through said partition disposed between said front edge and said overflow outlet, and a drain outlet disposed through said partition disposed between said front edge and said overflow outlet.

BRIEF DESCRIPTION OF THE DRAWINGS

One or more objects and advantages of the present invention will become apparent from the subsequent detailed description of the preferred embodiment and the appended claims taken in conjunction with the accompanying drawings where:

DETAILED DESCRIPTION OF THE INVENTION

Figure 1:
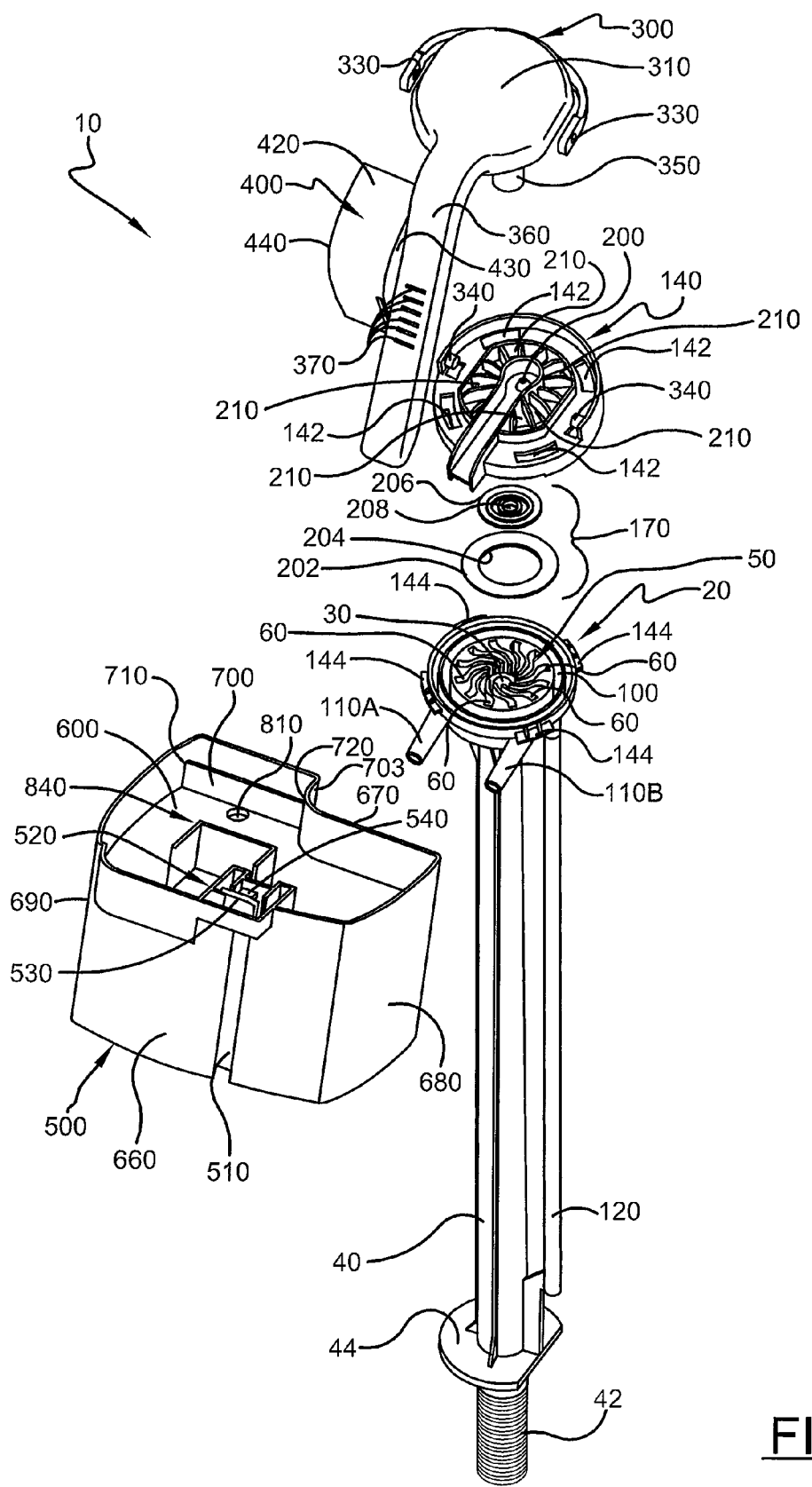
FIG. 1 is an exploded view of a pilot fill valve in accordance with the concepts of the present invention.
Figure 2:
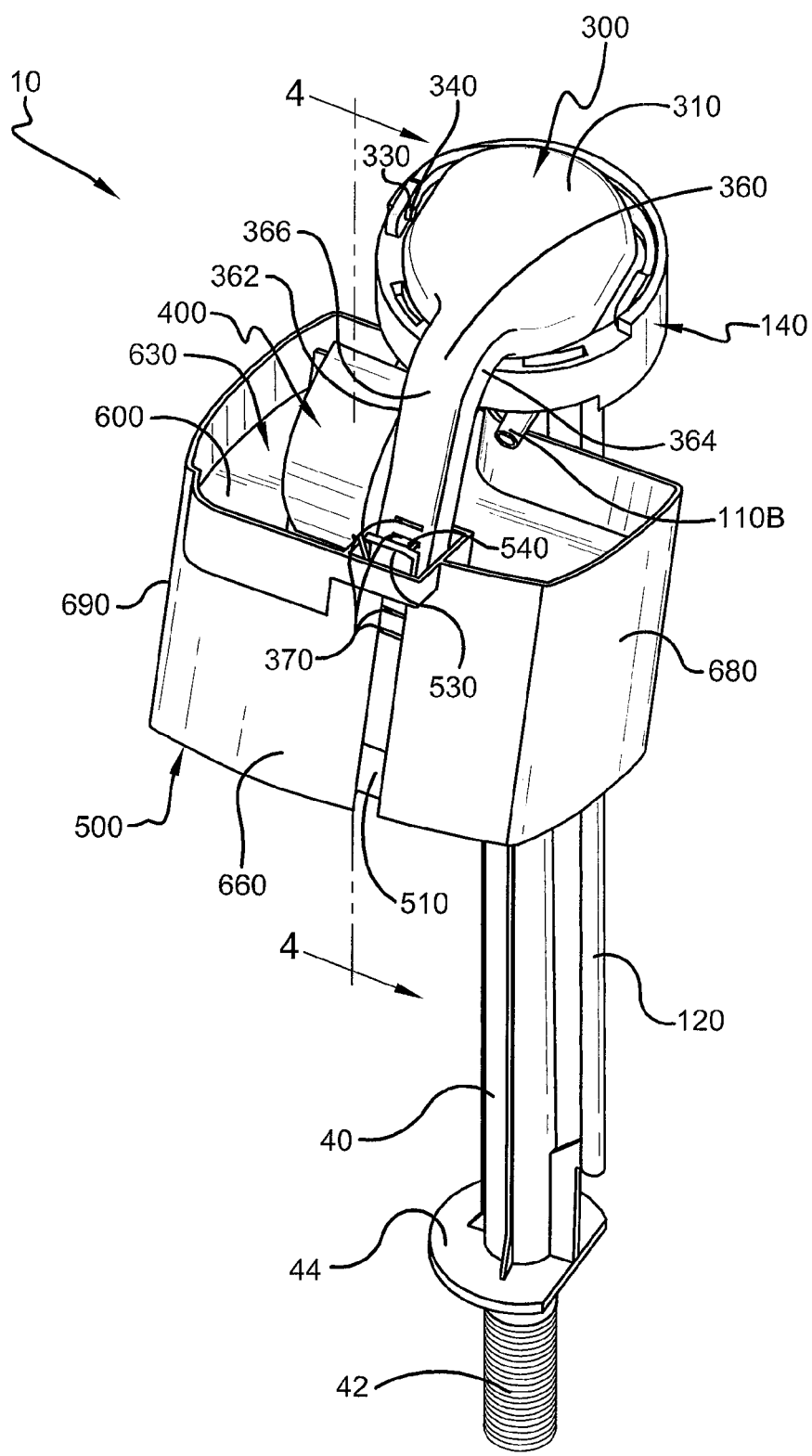
FIG. 2 is a perspective view of the pilot fill valve in accordance with the concepts of the present invention.
Figure 3:
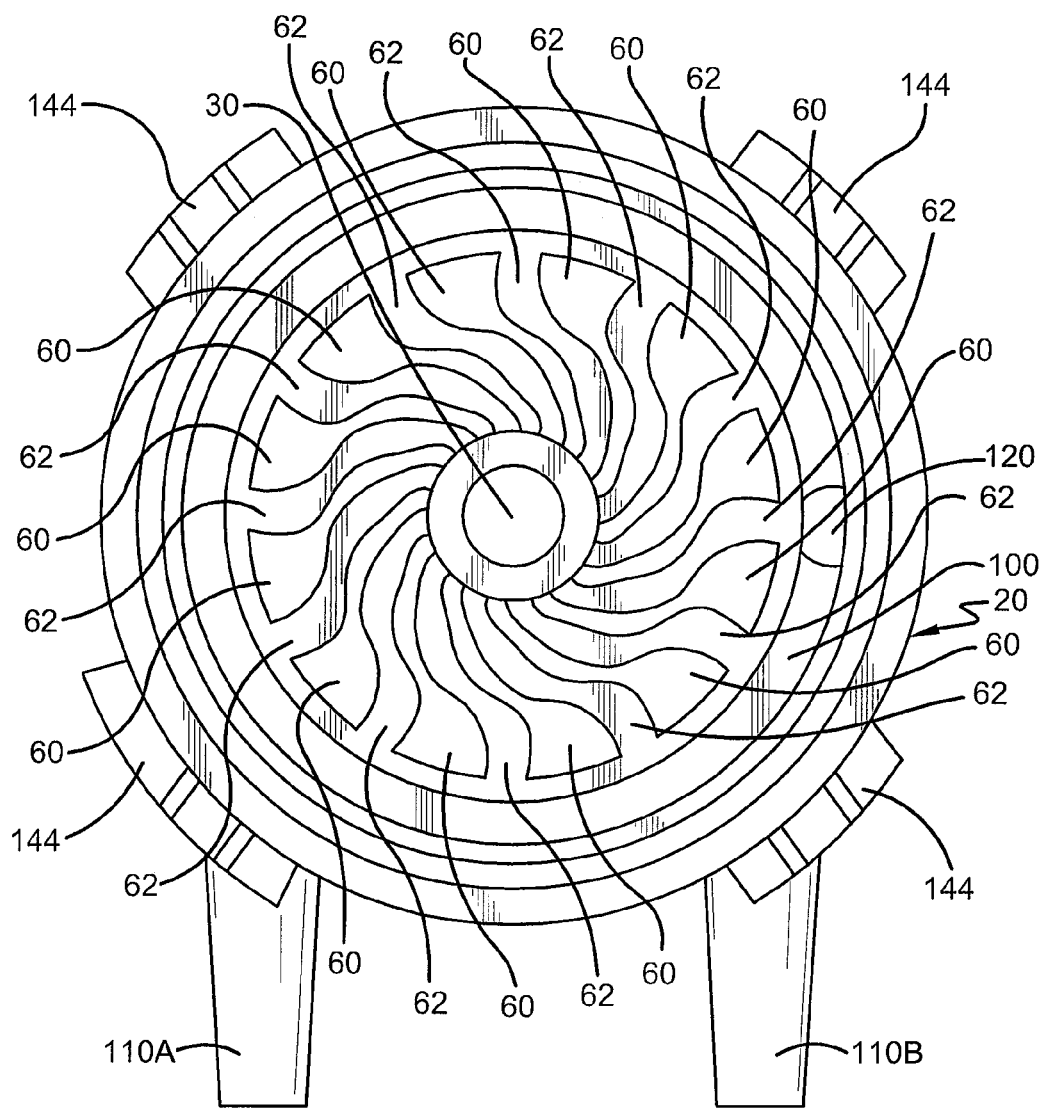
FIG. 3 is a top plan view of the diffuser provided by the valve body of the pilot fill valve in accordance with the concepts of the present invention.

A pilot fill valve in accordance with the concepts of the present invention is generally referred to by the numeral 10, as shown in FIGS. 1-6 of the drawings. The pilot fill valve 10 includes a valve body 20 having a water inlet aperture 30. Extending from the valve body 20 at as substantially right angle and in fluid communication with the inlet aperture 30 is a water inlet tube 40. The water inlet tube 40 has a threaded end 42 and support flange 44 at a position distal to the valve body 20 and is in fluid communication with a diffuser 50 maintained within the valve body 20. The diffuser 50, shown clearly in FIG. 3, comprises a plurality of vanes 60 that radially extend about the periphery of the inlet aperture 30 to form a plurality of channels 62. The routing channels 62 allow water received from the water inlet aperture 30 to be swirled or otherwise be dispersed, so as to reduce the operating noise associated with the valve 10. The valve body 20 also includes an annular collection channel 100 that circumscribes the outer edge or periphery of the vanes 60 and routing channels 62 to receive the water dispersed by the routing channels 62 of the diffuser 50. In fluid communication with the collection channel 100 are a pair of outlet ports 110A and 110B and water fill tube 120 that carry varying proportions of a water from the channel 100. While the function of outlet port 110A will be discussed in detail below, it should be appreciated that the outlet port 110B is configured to be removably attached to a refill hose (not shown) that supplies an amount of water to a toilet bowl and associated trap that are in fluid communication with the tank within which the valve 10 may be disposed.

The valve 10 also includes a valve cap 140 that is attached to the valve body 20 by suitable bayonet connectors 142 and 144, although any suitable means of connection may be used. The valve cap 140 and body 20 together retain a flexible diaphragm 170 between the inlet aperture 30 and a pilot shut-off vent 200 that extends through the valve cap 140. Specifically, the diaphragm 170 comprises a two-piece system that includes an annular outer ring 202 having an aperture 204 therethrough, and a control body 206 that is configured to be disposed within the aperture 204. The control body 206 includes a central aperture 208 therethrough to allow it to be affixed to the valve cap 140. It should be appreciated that the components of the diaphragm 170, including the annular outer ring 202 and the control body 206 may be formed from any suitable elastomeric material, such as rubber for example. Moreover, it should be appreciated that the annular outer ring 202 and control body 204 of the diaphragm 170 may comprise separate components, as shown in FIG. 1, or may be made integral as a single unified piece.

The valve cap 140 also includes air vents 210 that are disposed therethough, and which circumscribe the pilot shut-off vent 200. As such, the air vents 210 allow the valve 10 to pull air through the valve body 20 in the event that the water source coupled to the water inlet tube 40 attempts to siphon water back out of the tank in which the valve 10 is installed.

A pivot assembly 300 includes a cover or base 310 having attachment apertures 330 that are configured to be pivotably attached to tabs 340 maintained by the valve cap 140. The base 310 also includes a cap head 350 that is configured to occlude or close the shut-off vent 200. Specifically, the cap head 350 carries a rubber or elastomeric grommet that is suitable for closing off the shut-off vent 200 to outside environmental air. It should be appreciated that the cover or base 310 serves as a cover that prevents dust and/or other debris from clogging the air vents 210 provided by the valve cap 140.

Figure 4:
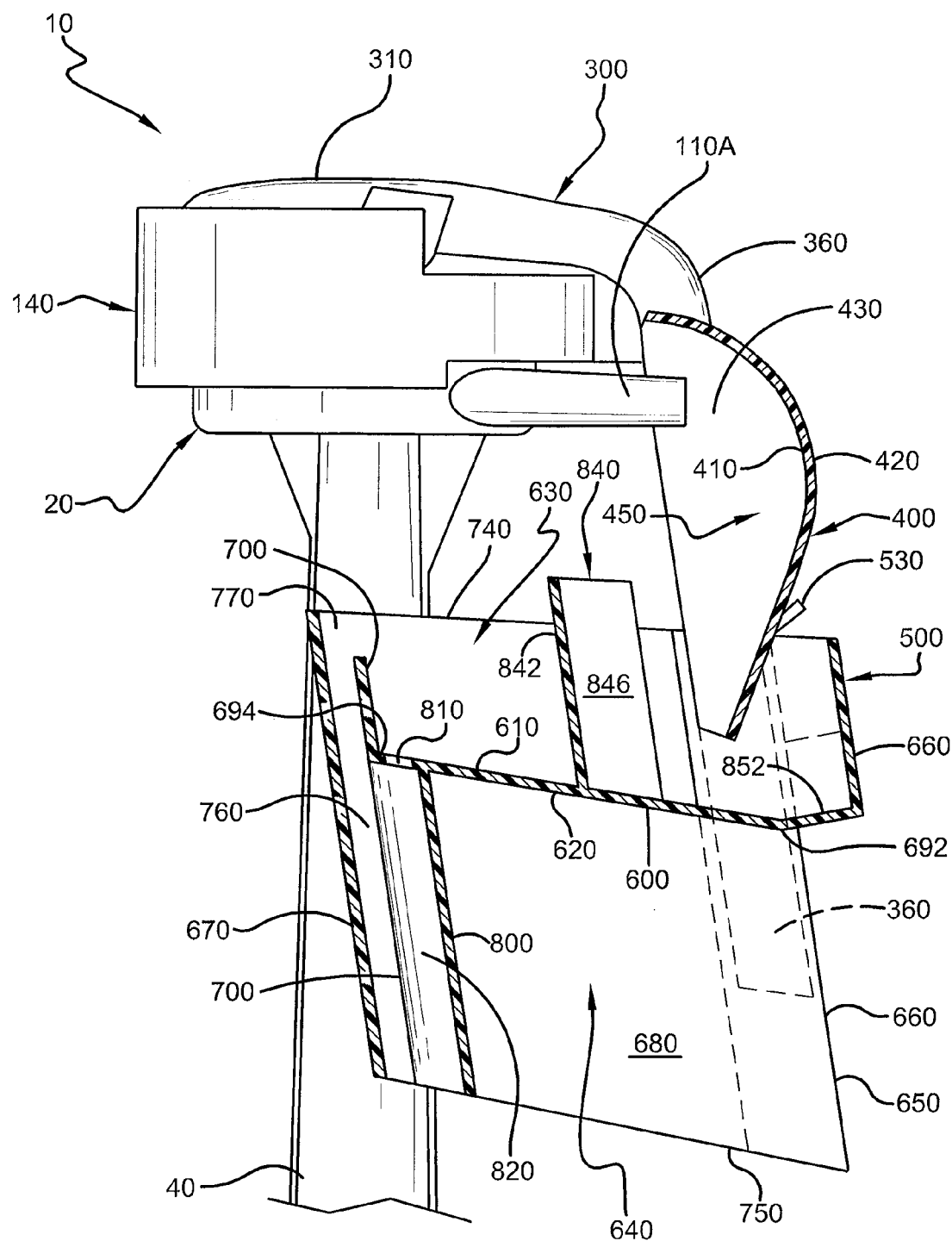
FIG. 4 is a sectional view of a float provided by the pilot fill valve in accordance with the concepts of the present invention.

Extending from the base 310 is an angled pivot arm 360 comprised of a pair of lateral sections 362 and 364 that extend at a substantially right angle from a main section 366. The main section 366 includes a plurality of spaced receiving slots 370 disposed therethrough, while a diverter 400 is attached to the lateral section 362 via any suitable means of attachment. In one aspect, the diverter 400 may be formed so as to be integral with the pivot arm 360. The diverter 400, as shown in FIG. 4, comprises a concave inner surface 410 and a convex outer surface 420 that is bounded by respective opposed lateral side walls 430,440. Thus, the concave inner surface 410 and lateral side walls 430,440 of the diverter 400 form a diverter cavity 450 that is configured to be in alignment with the outlet port 110A that extends in a substantially horizontal orientation from the pilot valve body 20.

Figure 5:
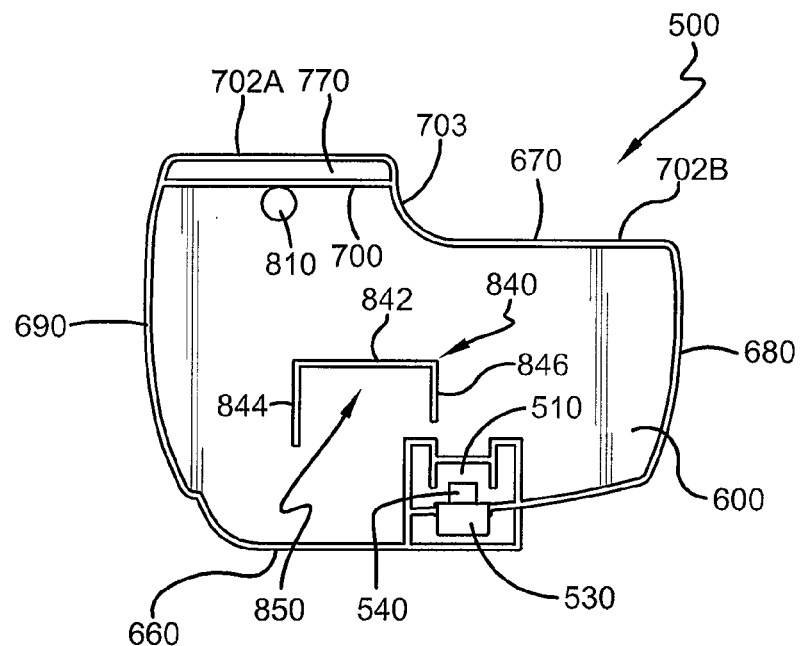
FIG. 5 is a top plan view of an upper cavity provided by the float in accordance with the concepts of the present invention.
Figure 6:
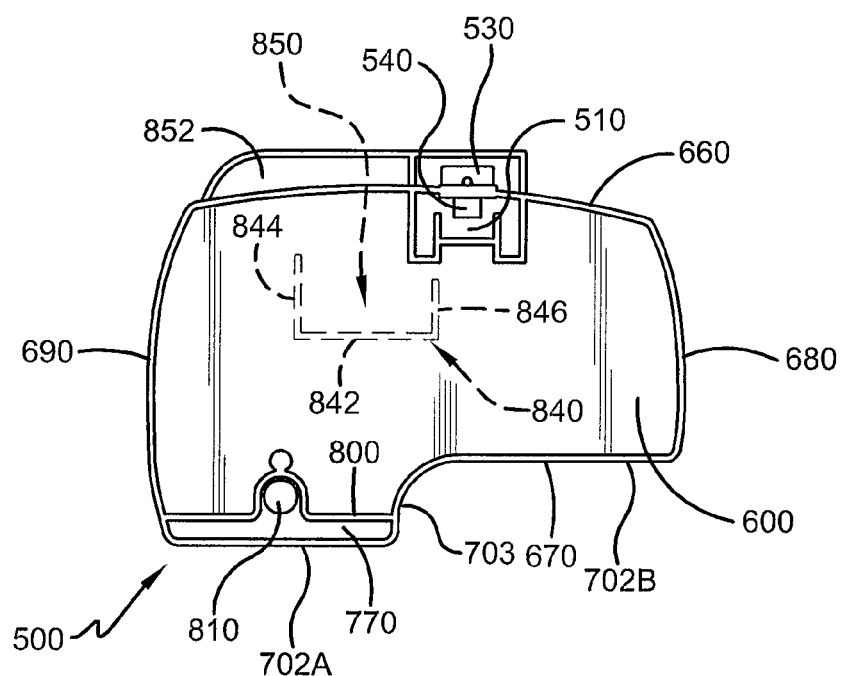
FIG. 6 is a bottom plan view of a lower cavity provided by the float in accordance with the concepts of the present invention.

The pilot fill valve 10 also includes a float 500, shown clearly in FIGS. 4-6, that has an attachment channel 510 configured to receive the pivot arm 360 therethrough. An adjustment assembly 520 provided by the float 500 comprises a user engageable retention arm 530 attached to a retention tab 540 that is configured for receipt within one of the receiving slots 370 disposed in the main section 366 of the pivot arm 360. As such, the position of the float 500 may be changed by depressing the retention arm 530 to release the retention tab 540 from one receiving slot 370, and then sliding the float 500 along the pivot arm 360 to a new position. Once the float 500 is placed in a new position the retention arm 530 is released by the user, so that the retention tab 540 is received within the receiving slot 370 corresponding to the new position of the float 500. Thus, by allowing the float 500 to move with respect to the pivot arm 360 a user is able to establish the water level that is desired to be attained when the tank is filled.

Continuing, the float 500 is configured with an angled partition 600 having opposed upper and lower surfaces 610 and 620 that separate the float 500 into opposed upper and lower cavities 630 and 640 that are bounded by a wall 650. The float wall 650 is defined by generally opposed front and rear walls 660,670 and opposed lateral walls 680,690, with the partition 600 sloping or angling upward from the front wall 660 to the rear wall 670. In other words, the partition 600 slopes upward from its front edge 692 adjacent the front wall 660 to its rear edge 694 adjacent the rear wall 670. Thus, when the pivot arm 360 and float 500 are in the lowest position, the partition 600 angles upward from its front edge 692 and away from the bottom of the tank (not shown) to which it is mounted. And when the pivot arm 360 and the float 500 are raised to their highest position, the partition 600 is substantially parallel to the bottom of the tank (not shown) to which the valve 10 is mounted.

The rear wall 670 comprises first and second sections 702A and 702B that are substantially perpendicularly offset by an offset section 703, thus forming section edges 710, 720, as shown in FIG. 1. As such, section 702A is distal to the front wall 660, while section 702B is proximate to the front wall 660. With reference to FIG. 4, spaced away and substantially parallel to the first section 702A of the rear wall 670 is an overflow wall 700 that laterally extends between the first and second edges 710,720 of the rear wall 670, and substantially vertically extends from the upper surface 610 of the partition 600 to a point just below a top edge 740 of the float wall 650. As such, the overflow wall 700 forms an overflow outlet 770 between the float wall 670 and the overflow wall 700. In one aspect, it should be appreciated that the bottom edge 750 of the wall 650 is configured to form a plane that is sloped or angled to be substantially parallel with that of the partition 600. Disposed through the partition 600 is a drain outlet or drain 810 through which water is routed by a drain wall 800 that extends downward from the lower surface 620 of the partition 600 to the bottom edge 750 of the wall 650. It should be appreciated that the overflow outlet 770 and the drain outlet 810 are fluidly combined by the drain wall 800 and the rear wall 670 to form an evacuation port 820.

Extending upward from the upper surface 610 of the partition 600 is a baffle 840 having a rear baffle wall 842 and opposed lateral baffle walls 844 and 846 that extend at a substantially right angle to that of the rear baffle wall 842, so as to form a baffle cavity 850. It should be appreciated that the rear baffle wall 842 and opposed lateral baffle walls 844, 846 are angled, so as to be substantially parallel with the angle of the pivot arm 360 when the float 500 is attached thereto. Moreover, the opposed front and rear walls 660,670 and opposed lateral walls 680,690 are also angled so as to be substantially parallel with the angle of the pivot arm 360 when the float 500 is attached thereto. Thus, the lateral baffle walls 844,846 are substantially parallel with the opposed lateral float walls 680,690, and the rear baffle wall 842 is substantially parallel with the opposed front and rear float walls 660,670.

In one aspect, the partition 600 may also include an angled section 852 that angles downward from the front wall 660 to the front edge 692, and which is substantially below the diverter 400. The angled section 852 serves to direct the water routed downward by the diverter 400 back toward the rear wall 670 of the float 500.

Thus, during operation of the pilot fill valve 110 within an empty tank, such as a toilet tank (not shown), the pivot arm 360 rotates downward, such that the shut-off vent 200 is uncovered by the cap head 350, causing the diaphragm 170 to unseal the inlet aperture 30 of the valve body 20. As such, water is permitted to enter the inlet tube 40 and is swirled or dispersed by the diffuser 50 in the pilot valve body 20 before entering the routing channel 62, whereupon portions of the water are simultaneously routed to the water fill tube 120 to fill the tank and to the outlet ports 110A and 110B. The water passing from the outlet port 110A is diverted by the concave cavity 410 of the diverter 400 back toward the baffle cavity 850 provided on the upper surface 610 of the partition 600 of the float 500. The diverted water slowly fills the portion of upper cavity 630 toward the front wall 660 of the float 500, increasing the weight of the float 500, thus requiring an increased buoyancy force to be imparted from the rising tank water to lift or otherwise rotate the float 500 upward via the pivot arm 360.

As the tank water level rises and engages the float 500, the pivot arm 360 and the float 500 begin to rotate in an upward direction, causing the water within the upper cavity 630 to flow upward along the angled partition 600 toward the rear wall 670 toward the drain outlet 810, whereupon the water begins to flow through the drain outlet 810 and back into the tank. Simultaneously, with the flow of water through the drain outlet 810, the water in the upper cavity 630 also begins to slosh or otherwise be driven toward the rear wall 670 and into the overflow outlet 770, such that it enters the tank via the evacuation port 820. Thus, as the water drains out of the upper cavity 630 through the evacuation port 820, via the drain outlet 810 and the overflow outlet 770, the float 500 begins to rotate upward with increased velocity as the weight of the float 500 decreases. The increased velocity of the float 500 allows the pivot arm 360 to also rotate with increased velocity, such that when the water in the tank rises to a filled level, the cap head 350 positively moves or rotates into position, fully and completely closing off the pilot shut-off vent 200.

Thus, the overflow outlet 760 provides a means to prevent the water from collecting within the upper cavity 630 beyond a predetermined level, making the float 500 too heavy for the rising water in the tank to lift. In other words, the overflow outlet 760 ensures that the float 500 can always be rotated upward by the rising water level in the tank so that the pivot arm 360 is able to rotate the cap head 350 to fully close off the shut-off vent 200 to ensure the valve 10 is shut off, thereby preventing the continuous supply of water into the tank, causing an undesirable overflow.

It should be appreciated that the float 500, as well as the other components of the fill valve 10, may be formed of any suitable material, such as plastic for example.

It will, therefore, be appreciated that one advantage of one or more embodiments of the present invention is that a pilot fill valve provides a partitioned float that has an upper cavity, allowing water collected therein to increase the weight of the float as water passes through the valve. Another advantage of the present invention is that the partitioned float includes an overflow that allows water collected in the upper cavity to be evacuated therefrom to allow rising tank water to rotate the float and pivot arm with increased velocity allowing the pilot cap carried thereby to fully shut off the valve.

Thus, it can be seen that one or more aspects of the invention have been satisfied by the structure and methods provided above. In accordance with the Patent Statutes, only the best mode and certain alternative embodiments have been presented in the application and described in any detail. It should be understood that the spirit and scope of the appended claims should not be limited to the description of the embodiments contained herein, the true scope and breadth of the invention being defined by the claims as follows.

What is claimed is:

1. A float assembly adapted to be attached to a pivot arm of a pilot fill valve, the pilot fill valve having an outlet port extending therefrom that supplies water to a diverter attached to the pivot arm, the float assembly comprising:
    a float divided by an angled partition sloping upward from a first edge to a second edge to form first and second cavities;
    an overflow outlet disposed through said partition proximate to said second edge; and
    a drain outlet disposed through said partition between said first edge and said overflow outlet.

2. The float assembly of claim 1, further comprising:
    a baffle extending from said partition into said first cavity, so as to deflect the flow of water from the outlet port into said first cavity.

3. The float assembly of claim 2, wherein said baffle is proximate to said first edge.

4. The float assembly of claim 1, wherein said float includes an attachment channel to receive the pivot arm therethrough.

5. The float assembly of claim 4, wherein said float includes an adjustment assembly to selectively attach said float along the pivot arm.

6. The float assembly of claim 1, wherein said first and second cavities are bounded by a wall.

7. The float assembly of claim 6, wherein said overflow outlet is defined by said wall and an overflow wall that extends between two points of said wall.

8. The float assembly of claim 7, wherein said overflow wall extends from said partition to a point below the top edge of said first cavity.

9. A pilot fill valve comprising:
a fill valve body having a rotating pivot arm with a diverter configured to divert water received from a outlet port; and
a float attached to said pivot arm, said float divided by an angled partition sloping upward from a first edge to a second edge, to form first and second cavities, said first cavity configured to receive diverted water from said outlet port, said float comprising:
an overflow outlet disposed through said partition between said first edge and said second edge; and
a drain outlet disposed through said partition between said first edge and said overflow outlet.

10. The pilot fill valve of claim 9, further comprising:
a baffle extending from said partition into said first cavity, so as to deflect the flow of water from said outlet port into said first cavity.

11. The pilot fill valve of claim 10, wherein said baffle is proximate to said first edge.

12. The pilot fill valve of claim 10, wherein said float includes an attachment channel to receive the pivot arm therethrough.

13. The pilot fill valve of claim 12, wherein said float includes an adjustment assembly to selectively attach said float along said pivot arm.

14. The pilot fill valve of claim 9, wherein said first and second cavities are bounded by a wall.

15. The pilot fill valve of claim 14, wherein said overflow outlet is defined by said wall and an overflow wall that extends between two points of said first wall.

16. The pilot fill valve of claim 15, wherein said overflow wall extends from said partition to a point below the top edge of said upper cavity.

17. The pilot fill valve of claim 9, wherein said float is attached to said pivot arm by an attachment means.

18. The pilot fill valve of claim 9, wherein said pilot fill valve body includes at least one air vent that is at least partially covered by a cover attached to said pivot arm.

* * * * *